US012795184B1

(12) United States Patent
Black et al.

(10) Patent No.: US 12,795,184 B1
(45) Date of Patent: Nov. 10, 2026

(54) PREDICTIVE ADVERTISEMENT BREAK DURATION SERVICE

(71) Applicant: Charter Communications Operating, LLC, St. Louis, MO (US)

(72) Inventors: Andrew Black, Aurora, CO (US); Michael Terada, Arvada, CO (US); Benjamin Lukehart, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 19/062,597

(22) Filed: Feb. 25, 2025

(51) Int. Cl.
*H04N 21/234* (2011.01)
*H04N 21/25* (2011.01)
*H04N 21/4784* (2011.01)

(52) U.S. Cl.
CPC ..... *H04N 21/23424* (2013.01); *H04N 21/251* (2013.01); *H04N 21/4784* (2013.01)

(58) Field of Classification Search
CPC ........... H04N 21/23424; H04N 21/251; H04N 21/4784
See application file for complete search history.

(56) References Cited

U.S. PATENT DOCUMENTS 10,522,186 B2 12/2019 Attorre et al.

*Primary Examiner* — Anthony Bantamoi
(74) *Attorney, Agent, or Firm* — Young Basile Hanlon & MacFarlane, P.C.

(57) ABSTRACT

Methods and systems for predicting advertisement break durations during content streaming. A method for dynamically inserting advertisements includes determining, by a predictive advertisement break duration machine learning model in a service provider system, predicted advertisement break durations for content being streamed by clients, generating, by a pre-decision engine in the service provider system, pre-decision requests to obtain advertisements for content currently being streamed by one or more clients, obtaining, by an advertisement router in the service provider system, a predicted advertisement break duration associated with each of the pre-decision requests, obtaining, by the advertisement router, advertisements in response to each pre-decision request and associated predicted advertisement break duration, and dynamically inserting, by a manifest manipulator in the service provider system, an advertisement in content for which an advertisement break message has occurred.

20 Claims, 4 Drawing Sheets

PREDICTIVE ADVERTISEMENT BREAK DURATION SERVICE

TECHNICAL FIELD

This disclosure relates to streaming. More specifically, dynamic insertion of advertisements into content streams based on predicted advertisement break durations.

BACKGROUND

Service providers provide content streams, such as, but not limited to, video streams, audio streams, and/or combinations thereof, to clients. The service providers insert client relevant advertisements into the content streams as a source of revenue. In general, a service provider system relies on "Digital Program Insertion Cueing Message for Cable" (SCTE 35) signals to indicate that an advertisement break is coming up in the content stream. Some service provider systems act on the SCTE 35 signals in real-time by collecting and providing the relevant advertisements. This may work in most scenarios when clients are watching different content streams. However, this may not scale effectively or work when the clients are all predominately watching one show and/or content stream and are hitting the advertisement break at exactly or nearly exactly the same time. This can create a burst in activity and in these instances, the service provider systems may get overloaded. Consequently, systems and methods are needed which can handle nominal and bursty content streaming events.

SUMMARY

Disclosed is a system and method for providing predictive advertisement break durations during content streaming. In implementations, a method for dynamically inserting advertisements includes determining, by a predictive advertisement break duration machine learning model in a service provider system, predicted advertisement break durations for content being streamed by clients, generating, by a pre-decision engine in the service provider system, pre-decision requests to obtain advertisements for content currently being streamed by one or more clients, obtaining, by an advertisement router in the service provider system, a predicted advertisement break duration associated with each of the pre-decision requests, obtaining, by the advertisement router, advertisements in response to each pre-decision request and associated predicted advertisement break duration, and dynamically inserting, by a manifest manipulator in the service provider system, an advertisement in content for which an advertisement break message has occurred.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
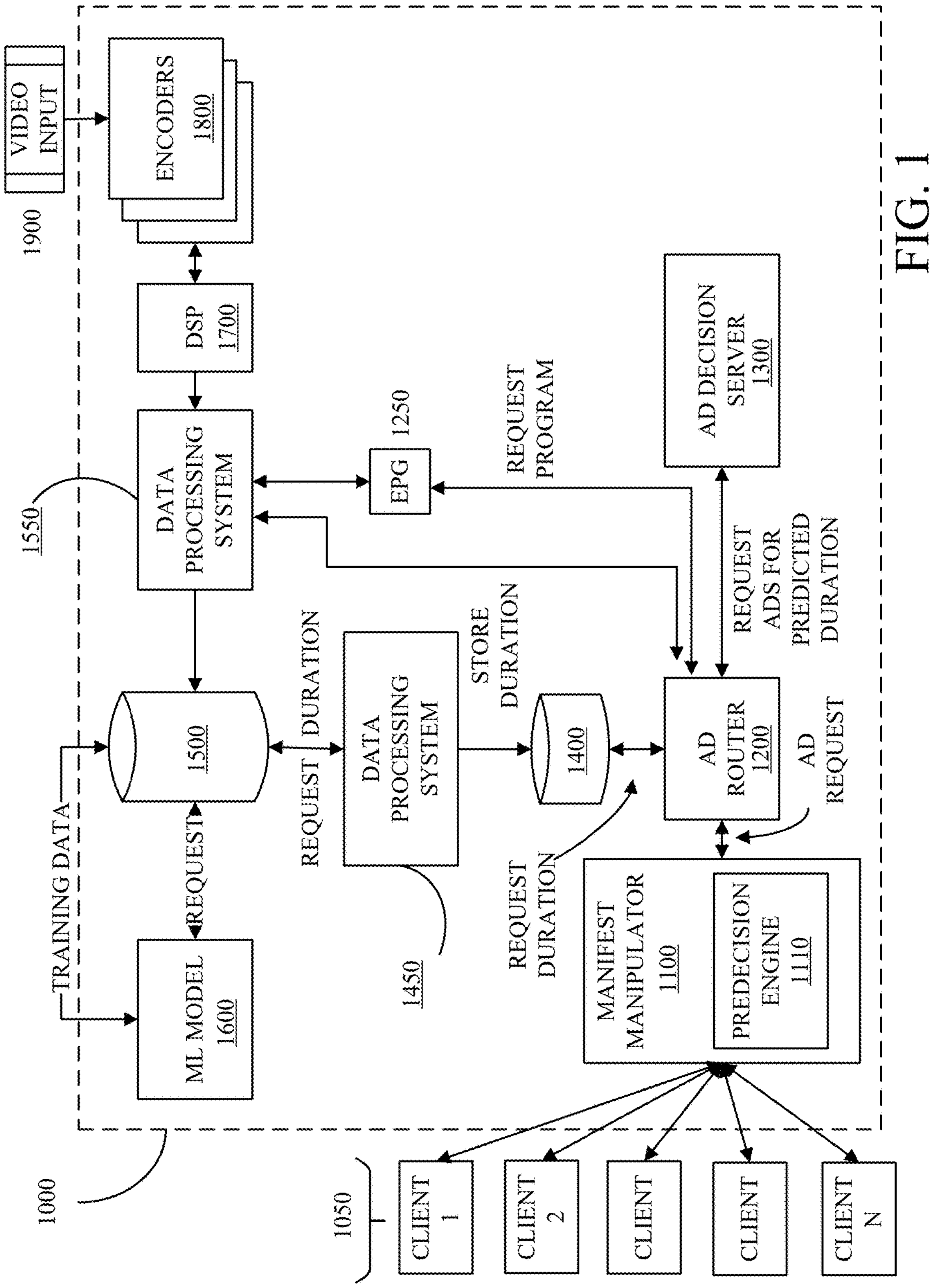
FIG. 1 is a diagram of an example of a service provider system in accordance with the teachings described herein.

Reference will now be made in greater detail to embodiments, examples of which are illustrated in the accompanying drawings. Wherever possible, the same reference numerals will be used throughout the drawings and the description to refer to the same or like parts.

As used herein, the terminology "server", "computer", "computing device or platform", or "cloud computing system" includes any unit, or combination of units, capable of performing any method, or any portion or portions thereof, disclosed herein. For example, the "server", "computer", "computing device or platform", or "cloud computing system" may include at least one or more processor(s).

As used herein, the terminology "processor" or "processing circuitry" indicates one or more processors, such as one or more special purpose processors, one or more digital signal processors, one or more microprocessors, one or more controllers, one or more microcontrollers, one or more application processors, one or more central processing units (CPU) s, one or more graphics processing units (GPU) s, one or more digital signal processors (DSP) s, one or more application specific integrated circuits (ASIC) s, one or more application specific standard products, one or more field programmable gate arrays, any other type or combination of integrated circuits, one or more state machines, or any combination thereof.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory and hardware that is hard-wired into the processing circuitry.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the term "memory" includes one or more memories, where each memory may be a computer-readable medium. A memory may encompass memory hardware units (e.g., a hard drive or a disk) that store data or instructions in software form. Alternatively or in addition, the memory may include data or instructions that are hard-wired into processing circuitry. The memory may include a single memory unit or multiple joint or disjoint memory units, which each of the multiple joint or disjoint memory units storing all or a portion of the data described as being stored in the memory.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. For example, the memory can be non-transitory. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term “application” refers generally to a unit of executable software that implements or performs one or more functions, tasks, or activities. For example, applications may perform one or more functions including, but not limited to, telephony, web browsers, e-commerce transactions, media players, scheduling, management, smart home management, entertainment, and the like. The unit of executable software generally runs in a predetermined environment and/or a processor.

As used herein, the terminology “determine” and “identify,” or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology “example,” “the embodiment,” “implementation,” “aspect,” “feature,” or “element” indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology “or” is intended to mean an inclusive “or” rather than an exclusive “or.” That is, unless specified otherwise, or clear from context, “X includes A or B” is intended to indicate any of the natural inclusive permutations. That is, if X includes A; X includes B; or X includes both A and B, then “X includes A or B” is satisfied under any of the foregoing instances. In addition, the articles “a” and “an” as used in this application and the appended claims should generally be construed to mean “one or more” unless specified otherwise or clear from the context to be directed to a singular form.

As used herein, unless explicitly stated otherwise, any term specified in the singular may include its plural version. For example, “a computer that stores data and runs software,” may include a single computer that stores data and runs software or two computers-a first computer that stores data and a second computer that runs software. Also “a computer that stores data and runs software,” may include multiple computers that together stored data and run software. At least one of the multiple computers stores data, and at least one of the multiple computers runs software.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure and claims. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described teachings and/or embodiments that are relevant for a clear understanding of the herein disclosed processes, machines, and/or manufactures, while eliminating for the purpose of clarity other aspects that may be found in typical similar devices, systems, and methods. Those of ordinary skill may thus recognize that other elements and/or steps may be desirable or necessary to implement the devices, systems, and methods described herein. However, because such elements and steps do not facilitate a better understanding of the disclosed teachings and/or embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Service provider systems use “Digital Program Insertion Cueing Message for Cable” (SCTE 35) signals to indicate that an advertisement break is coming up in the content stream and the duration of the advertisement break (“advertisement break message”). This occurs about 4 to 25 seconds prior to the actual advertisement break. The service provider system notes the advertisement break and makes it available to components in the service provider system, such as, but not limited to, a manifest manipulator. The manifest manipulator supplies the data and/or content stream to each client being serviced by the service provider. The manifest manipulator can determine that an advertisement break is coming up and the duration of the advertisement break. For example, the advertisement break duration can be 30 seconds, 60 seconds, 90 seconds, and so on. The manifest manipulator can reach out to an advertisement router, which in turn can reach out and collect advertisements from multiple advertisement servers to fill out the advertisement break duration. The advertisement router sends back the response back to the manifest manipulator. The manifest manipulator creates the spliced streams for each playback client. The manifest manipulator then returns a playlist back to each client. The playlist and advertisements may be, but not limited to, specific to each client, specific to a geographic region based on the client, time based, date based, and/or combinations thereof. The clients receive the playlists and then start playing the playlist. This all happens a few seconds before the actual advertisement occurs. This all happens in real time. In summary, the manifest manipulator handles stream requests, makes advertisement determinations, requests advertisements, inserts the advertisements seamlessly in the content streams, all while content streaming. That is, everything happens in real-time.

The above may work in most scenarios when clients are watching different content streams. However, this may not scale effectively or work when the clients are all predominately watching one show and/or content stream and hitting the advertisement break at exactly or nearly exactly the same time. This can create a burst in activity and in these instances, the manifest manipulator may get overloaded.

Issues related to bursty activity can be addressed by using pre-decision methods in the manifest manipulator. In pre-decision methods, when a user tunes to a channel (i.e., initiates a content streaming session), the manifest manipulator will, after a predetermined pre-decision interval, generate a pre-decision request, send the pre-decision request, and collect advertisements. In this instance, the pre-decision request uses a static advertisement break duration. That is, the manifest manipulator will request advertisements from the advertisement router and advertisement servers as described earlier. The manifest manipulator will collect and hold the advertisements for each user, associated client, and/or streaming session.

The static advertisement break duration is preset for each content stream and/or IP linear stream. The use of the static advertisement break duration can result in underfilling and overfilling. Underfilling advertisement breaks can result in revenue loss by not filling the actual advertisement break. Overfilling advertisement breaks can cause abrupt transitions between the advertisement and content, resulting in poor user experience. Moreover, static advertisement break duration settings require that for every variation of advertisement break duration desired to be used, a high cardinality set of templates and workflows be used to facilitate engaging a pre-decisioning feature.

Described herein are systems and methods for predicting advertisement break durations during content streaming. In implementations, a machine learning model can be trained to predict near-future advertisement break durations. This enables the service provider system to pre-decide advertisement decisions for any type of live content and reduce the bursty load demands put on upstream advertisement decision services, including for example, the manifest manipulator, during high concurrent events. In implementations, the service provider system can provide SCTE 35 messages for training a predictive advertisement break duration machine learning model and as feedback for executed advertisement insertions. The predictive advertisement break duration machine learning model can predict what the duration of the next advertisement break will be, thereby maximizing advertisement break fills efficiently. In implementations, the advertisement break duration can be predicted based on, but not limited to, date, time, content type, service type, and/or combinations thereof.

In implementations, a predictive advertisement break duration machine learning model can be trained using SCTE 35 (advertisement break) messages, which include but is not limited to, a content stream identifier, advertisement break duration, and a time of the advertisement break (collectively "advertisement break data"). The messages and advertisement break data can be accumulated and provided to a machine learning model for initially training the machine learning model to form the predictive advertisement break duration machine learning model. A continuous flow of these SCTE 35 messages and advertisement break data can be provided to further train the predictive advertisement break duration machine learning model and as feedback to the predictive advertisement break duration machine learning model for executed and/or processed dynamic advertisement insertions. The continuous flow can be throughout the days and years based on various events including, but not limited to, sports, news, shows, and the like. This will allow any number of linear streams to be modeled for predictive advertisement break durations.

In implementations, the service provider system and/or manifest manipulator can make pre-decision requests which include a content stream identifier and a current date timestamp. The predictive advertisement break duration machine learning model can provide a suggested and/or predicted advertisement break duration. The advertisement router can use the suggested and/or predicted advertisement break duration to request relevant advertisements from an advertisement decision server. The response back to the manifest manipulator will contain advertisements that best fill the predicted advertisement break duration. In implementations, the predictive advertisement break duration machine learning model can be conservative such that the suggested and/or predicted advertisement break duration errors on the side of longer durations. In these instances, the manifest manipulator can cut off excess advertisements.

In implementations, the manifest manipulator is able to better fill an advertisement break for pre-decisioning due to the more precise and accurate advertisement break durations.

FIG. 1 is a diagram of an example of a service provider system 1000 in accordance with the teachings described herein. The service provider system 1000 may provide services, such as content streaming, to clients 1, 2, . . . , N 1050 (collectively "clients 1050"). The service provider system 1000 may include, but is not limited to, a manifest manipulator 1100, an advertisement router 1200, an electronic program guide (EPG) 1250, an advertisement server 1300, a predicted advertisement break duration cache 1400, a data processing system 1450, a database 1500, a predictive advertisement break duration machine learning model 1600, a data processing system 1550, a digital signal processor 1700, and encoder(s) 1800. The number of components shown herein are illustrative and there may be more or less in the service provider system 1000. The service provider system 1000 and the components therein may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

In implementations, the manifest manipulator 1100 supplies the data and/or content stream to each of the clients 1050 being serviced by the service provider system 1000. The manifest manipulator 1100 may have access to SCTE 35 messages and advertisement break data as determined by the digital signal processor 1700. The manifest manipulator can perform dynamic advertisement insertion for each client which includes, but is not limited to, making advertisement pre-decision requests, requesting advertisements from the advertisement router 1200, and inserting the collected advertisements seamlessly in the respective streams. The manifest manipulator can execute dynamic advertisement insertion for each client and/or user session based on a variety of factors including, but not limited to, IP address, zip code, what content is being watched, type of viewing device, and/or combinations thereof.

In implementations, the manifest manipulator 1100 may include a pre-decision engine 1110 which attempts to alleviate the burstiness of dynamic advertisement insertions. In implementations, the pre-decision engine 1110 can make pre-decision advertisement requests once a user has selected a channel and/or what content they are going to watch ("watch start time"). In implementations, the pre-decision engine 1110 can send pre-decision advertisement requests a defined period after the watch start time. In implementations, the pre-decision engine 1110 can send further pre-decision advertisement requests after execution of dynamic advertisement insertions are completed. The pre-decision advertisement requests can include, but is not limited to, a predicted advertisement break duration request. The manifest manipulator 1100 can send the pre-decision advertisement request(s) to the advertisement router 1200. In implementations, the manifest manipulator 1100 can obtain predicted advertisement break durations for each pre-decision advertisement request and/or predicted advertisement break duration request from the predictive advertisement break duration machine learning model 1600 via at least the advertisement router 1200 and the cache 1400 as described herein. In implementations, the manifest manipulator 1100 can obtain the predicted advertisement break durations and the advertisements from the advertisement router 1200. The manifest manipulator 1100 can dynamically insert the collected advertisements in the stream when the advertisement break occurs. In implementations, the manifest manipulator 1100 can select which advertisements to dynamically insert based on user and/or client characteristics, such as, but not limited to, IP address, location, program, date, time, and/or combinations thereof. The manifest manipulator 1100 can send the spliced stream to the respective clients 1050.

In implementations, the advertisement router 1200 can receive pre-decision advertisement requests from the manifest manipulator 1100 and receive predicted advertisement break durations from the predictive advertisement break duration machine learning model 1600 via at least the cache 1400 as described herein. The advertisement router 1200 can request advertisements from the advertisement server 1300 based on the pre-decision advertisement request and the predicted advertisement break duration. The advertisement router 1200 can send the predicted advertisement break duration and the advertisements to the manifest manipulator 1100. In implementations, the advertisement router 1200 and the digital signal processor 1700 may use a key pair data to correlate content streams so that the predicted advertisement break durations can be used correctly.

In implementations, the electronic program guide (EPG) 1250 can send program information including, but not limited to, stream identifier, content identifier, time, date, program, network, and/or other related information to the data processing system 1550, which can correlate and/or augment the SCTE 35 and/or advertisement break messages with the program information. The EPG 1250 can send the program information to the advertisement router 1200, which can use the pre-decision advertisement request and the program information to obtain the predicted advertisement break duration. The program information can be used by the service provider system 1000 to store certain of the predicted advertisement break durations from the database 1500 to the predicted advertisement break duration cache 1400.

In implementations, the advertisement server 1300 can obtain advertisements from advertisement providers in response to receiving the pre-decision advertisement requests and the predicted advertisement break durations from the advertisement router 1200. The advertisement server 1300 can forward the collected advertisements to the advertisement router 1200, which in turn can forward the advertisements to the manifest manipulator 1100.

In implementations, the predicted advertisement break duration cache 1400 can store predicted advertisement break durations made by the predictive advertisement break duration machine learning model 1600 via the data processing system 1450 and the database 1500. Each of the predicted advertisement break durations can be annotated and/or indexed using at least the program information provided by the EPG 1250 to the data processing system 1550. The predicted advertisement break duration cache 1400 can alleviate spiked and/or bursty processing at the predictive advertisement break duration machine learning model 1600.

In implementations, the data processing system 1450 can process advertisement duration requests from the advertisement router 1200 and populate the predicted advertisement break duration cache 1400, as needed.

In implementations, the database 1500 can store annotated advertisement message data from the data processing system 1550, where the annotated advertisement message data is the SCTE 35 messages and advertisement break data annotated with the program information. The annotated advertisement message data can be used by the predictive advertisement break duration machine learning model 1600 to initially train a machine learning model and continuously train the machine learning model for new programs. The annotated advertisement message data can also be used by the predictive advertisement break duration machine learning model 1600 as feedback based on completed advertisement insertions. The predicted advertisement break duration can be compared against the known advertisement break duration available in the SCTE 35 message. The feedback can be used to further train the predictive advertisement break duration machine learning model 1600. The database 1500 can also store the predicted advertisement break durations from the predictive advertisement break duration machine learning model 1600.

In implementations, the encoder(s) 1800 can process video input(s) 1900 and can identify advertisement breaks, i.e., the SCTE 35 message, in the content stream including the start times, end times, and duration. The encoder(s) 1800 can send the SCTE 35 message to the digital signal processor 1700, so that the digital signal processor 1700 can determine what to do with it.

In implementations, the digital signal processor 1700 can analyze the SCTE 35 message and determine whether an advertisement insertion is appropriate and needed. The digital signal processor 1700 can forward the SCTE 35 message to other components in the service provider system 1000 to execute dynamic advertisement insertion and enable predictive advertisement break duration. The manifest manipulator 1100 can access the SCTE 35 message to initiate a dynamic advertisement insertion using the advertisements collected based on the predicted advertisement break duration. The data processing system 1550 can use the SCTE 35 message to form training data for the predictive advertisement break duration machine learning model 1600. The data processing system 1550 can use the SCTE 35 message as feedback for the predictive advertisement break duration machine learning model 1600.

In implementations, the data processing system 1550 can process SCTE 35 messages and advertisement break data with program information to generate the annotated advertisement message data, which can be stored in the database 1500 as ongoing and continuous training data for the predictive advertisement break duration machine learning model 1600.

In implementations, the predictive advertisement break duration machine learning model 1600 can be a machine learning model initially trained on SCTE 35 messages and advertisement break data collected for a variety of programs (i.e., video streams), where the SCTE 35 messages and advertisement break data is annotated with program information. The output of the predictive advertisement break duration machine learning model 1600 can be stored in the database 1500 where it can be indexed using, but not limited to, program information. The predictive advertisement break duration machine learning model 1600 can be continuously trained using video streams processed by the service provider system 1000. The predictive advertisement break duration machine learning model 1600 can be positively or negatively rewarded when an advertisement insertion is initiated due to a SCTE 35 message in a video stream. The program information and/or other indexing information can be used to indicate which predicted advertisement break duration should be compared to the actual advertisement break duration. Comparison of the two values can determine a reward type for the predictive advertisement break duration machine learning model 1600.

Figure 2:
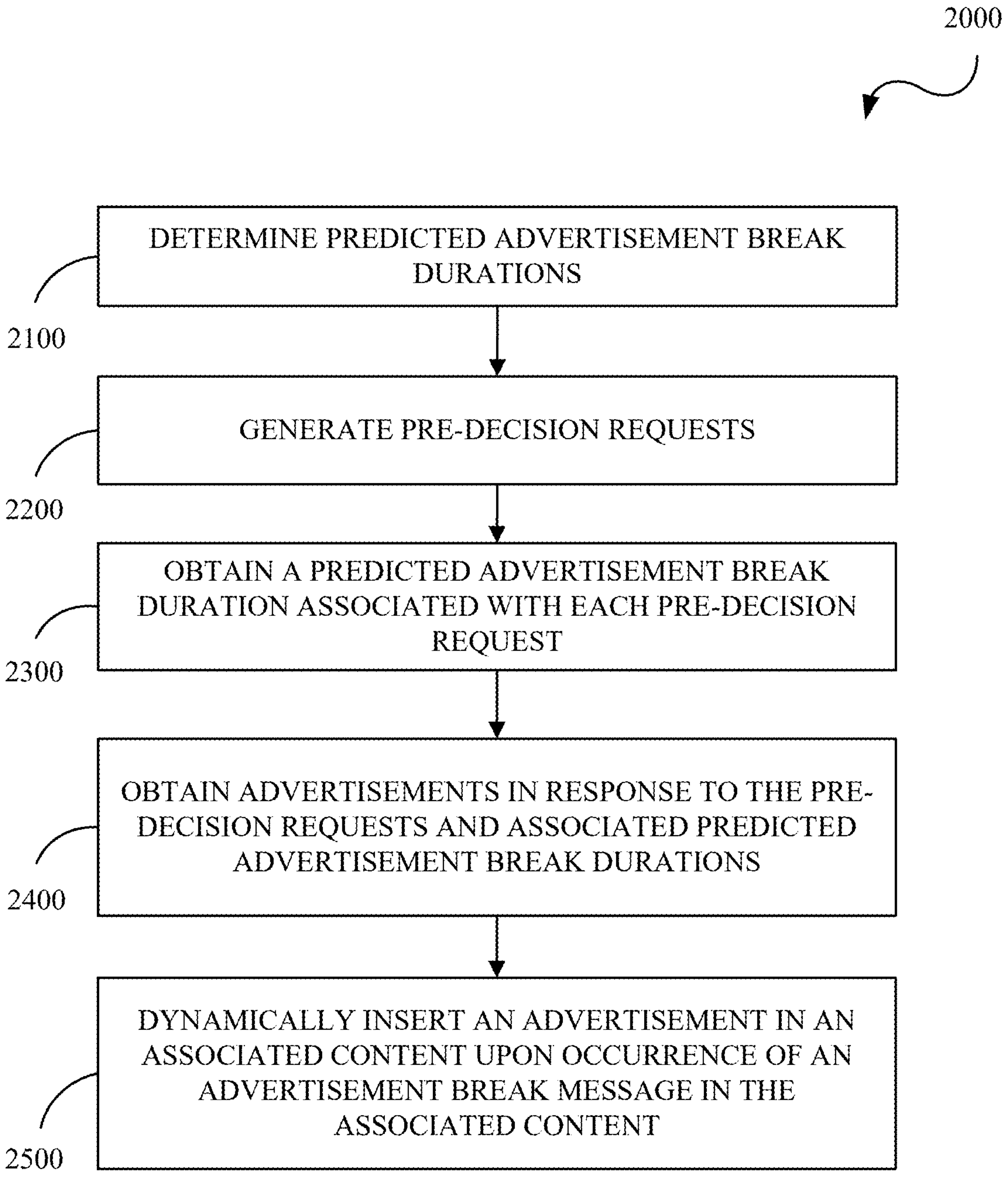
FIG. 2 is a flowchart of an example method for dynamic advertisement insertion in accordance with the teachings described herein.

FIG. 2 is a flowchart of an example method 2000 for dynamic advertisement insertion in accordance with the teachings described herein. The method 2000 includes: determining 2100, by a predictive advertisement break duration machine learning model, predicted advertisement break durations for content being streamed by clients; generating 2200, by a pre-decision engine, pre-decision requests for advertisements for the content; obtaining 2300, by an advertisement router, a predicted advertisement break duration associated with each of pre-decision requests; obtaining 2400, by an advertisement router, advertisements in response to the pre-decision requests and associated predicted advertisement break durations; and dynamically inserting 2500, by a manifest manipulator, an advertisement in an associated content upon occurrence of an advertisement break message in the associated content. The method 2000 can be implemented, for example, in or by components described with respect to FIG. 1 and in conjunction with the flow described with respect to FIG. 3, as appropriate and applicable.

The method 2000 includes determining 2100, by a predictive advertisement break duration machine learning model, predicted advertisement break durations for content being streamed by clients. A predictive advertisement break duration machine learning model is a machine learning model trained as described in FIG. 3. The predictive advertisement break duration machine learning model is triggered by advertisement requests and/or pre-decision requests. In implementations, the predictive advertisement break duration machine learning model is triggered when the advertisement router receives a request from the manifest manipulator which did not include an advertisement break duration and there was no advertisement break duration already present in the cache. The predicted advertisement break durations are indexed using program information and are stored in a database. Certain of the predicted advertisement break durations are stored in a cache, where selection is based on, but not limited to, what clients are watching, what is being watched, time of day, date, and/or other caching factors, and/or combinations thereof.

The method 2000 includes generating 2200, by a pre-decision engine, pre-decision requests for advertisements for the content, and obtaining 2300, by an advertisement router, a predicted advertisement break duration associated with each of pre-decision requests. A pre-decision engine in a manifest manipulator can generate a pre-decision request to collect advertisements prior to an actual advertisement break message in the content being streamed. These pre-decision requests can occur after a client starts streaming content and following insertion of an advertisement in a content stream. The pre-decision requests do not have advertisement duration as the advertisement break message has not yet occurred. Consequently, the pre-decision requests are used by the advertisement router to obtain associated predicted advertisement break durations. The pre-decision requests stagger processes being performed by the service provider system with respect to dynamic advertisement insertion. As a consequence, if clients are all watching the same content and hitting the service provider system for advertisement insertion at the same time, the manifest manipulator only has to select appropriate advertisements for each client in contrast to having to do the entire process.

The method 2000 includes obtaining 2400, by an advertisement router, advertisements in response to the pre-decision requests and associated predicted advertisement break durations. Once the predicted advertisement break duration is obtained from the cache and/or database, the advertisement router can request advertisements from advertisement servers. The advertisements are sent to the manifest manipulator, which in turn stores the advertisements.

The method includes dynamically inserting 2500, by a manifest manipulator, an advertisement in an associated content upon occurrence of an advertisement break message in the associated content. The manifest manipulator selects appropriate advertisements from the stored advertisement to splice in the stream of a respective client.

In implementations, upon occurrence of the advertisement break message, the service provider system can send the actual advertisement break duration to the predictive advertisement break duration machine learning model as feedback as described herein. This can include comparing an actual advertisement break duration in the advertisement break message with the predicted advertisement break duration and applying a reward to the advertisement break duration machine learning model based on the comparison.

Figure 3:
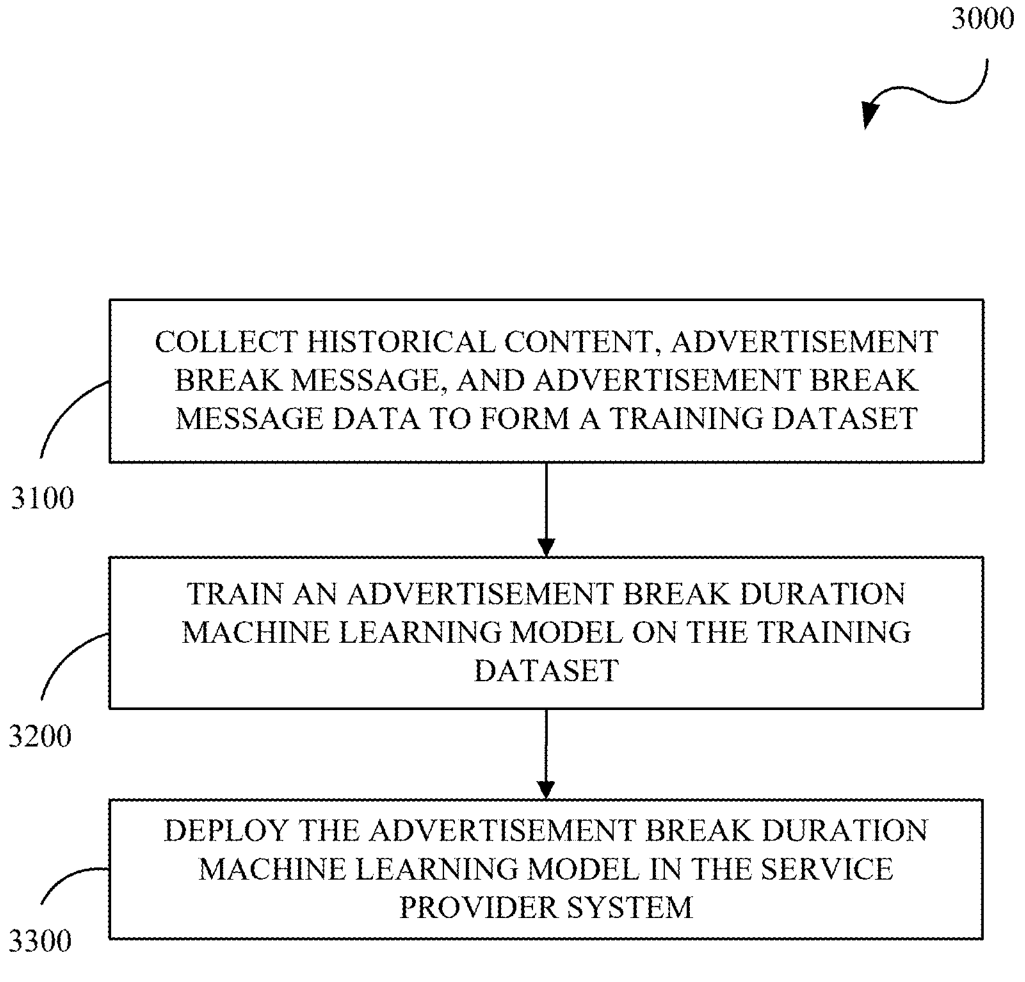
FIG. 3 is a flowchart of an example method for training an advertisement break duration machine learning model in accordance with the teachings described herein.

FIG. 3 is a flowchart of an example method 3000 for training an advertisement break duration machine learning model in accordance with the teachings described herein. The method 3000 includes: collecting 3100 historical content, advertisement break message, and advertisement break message data to form a training dataset; training 3200 an advertisement break duration machine learning model on the training dataset; and deploying 3300 the advertisement break duration machine learning model in the service provider system. The method 3000 can be implemented, for example, in or by components described with respect to FIG. 1 and in conjunction with the flow described with respect to FIG. 2, as appropriate and applicable.

The method 3000 includes collecting 3100 historical content, advertisement break message, and advertisement break message data to form a training dataset. A service provider can collect content, SCTE 35 messages, advertisement break durations, program information, requests, and/or other related information to generate a training dataset.

The method 3000 includes training 3200 an advertisement break duration machine learning model on the training dataset. A machine learning model can be initially trained with the training dataset to form the advertisement break duration machine learning model.

The method 3000 includes deploying 3300 the advertisement break duration machine learning model in the service provider system. The trained machine learning model can be deployed in the service provider system to predict advertisement break durations. In implementations, the advertisement break duration machine learning model can be continuously trained with content being processed by the service provider system and streamed to the clients. In implementations, the advertisement break duration machine learning model can receive feedback upon the occurrence of a SCTE message. The actual advertisement break duration can be compared to the predicted advertisement break duration. A reward engine and/or function can apply a reward on the advertisement break duration machine learning model based on the comparison.

Figure 4:
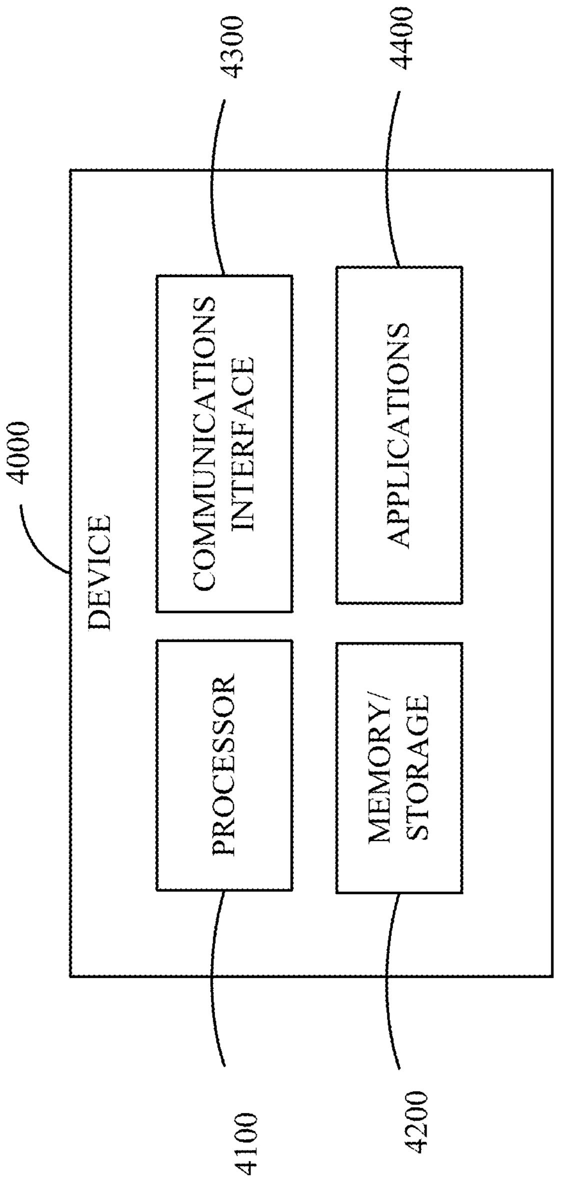
FIG. 4 is a block diagram of an example of a device in accordance with the teachings described herein.

FIG. 4 is a block diagram of an example of a device 4000 in accordance with the teachings described herein. The device 4000 may include, but is not limited to, a processor 4100, a memory/storage 4200, a communication interface 4300, and applications 4400. The device 4000 may include or implement, for example, the systems and components described with respect to FIG. 1 and the implement the methods described with respect to FIGS. 2-3. The applicable or appropriate flows, techniques, or methods described herein may be stored in the memory/storage 4200 and executed by the processor 4100 in cooperation with the memory/storage 4200, the communications interface 4300, and the applications 4400, as appropriate. The device 4000 may include other elements which may be desirable or necessary to implement the devices, systems, and methods described herein. However, because such elements and steps do not facilitate a better understanding of the disclosed embodiments, a discussion of such elements and steps may not be provided herein.

Described is a method for providing predictive advertisement break durations during content streaming. In implementations, the method for dynamically inserting advertisements includes determining, by a predictive advertisement break duration machine learning model in a service provider system, predicted advertisement break durations for content being streamed by clients, generating, by a pre-decision engine in the service provider system, pre-decision requests to obtain advertisements for content currently being streamed by one or more clients, obtaining, by an advertisement router in the service provider system, a predicted advertisement break duration associated with each of the pre-decision requests, obtaining, by the advertisement router, advertisements in response to each pre-decision request and associated predicted advertisement break duration, and dynamically inserting, by a manifest manipulator in the service provider system, an advertisement in content for which an advertisement break message has occurred.

In implementations, the method further includes training the advertisement break duration machine learning model on a training dataset including historical content, advertisement break messages, advertisement break message data, and program information, and deploying the advertisement break duration machine learning model in the service provider system. In implementations, the method further includes continuously training the advertisement break duration machine learning model on each content processed by the service provider system. In implementations, the method further includes providing feedback to the advertisement break duration machine learning model upon occurrence of the advertisement break message. In implementations, the providing further includes comparing an actual advertisement break duration in the advertisement break message with the predicted advertisement break duration, and applying a reward to the advertisement break duration machine learning model based on the comparison. In implementations, the method further includes storing certain of the predicted advertisement break durations in a cache based on at least client and time of day. In implementations, the predicted advertisement break durations are indexed by program information.

Described is a system for providing predictive advertisement break durations during content streaming. In implementations, the system includes a predictive advertisement break duration machine learning model configured to provide predictive advertisement break durations for content streams and an advertisement router. The advertisement router configured to receive a pre-decision request from a manifest manipulator for a client content stream, obtain a predictive advertisement break duration for the pre-decision request, obtain an advertisement based on the pre-decision request and the predictive advertisement break duration, and send the advertisement and the predictive advertisement break duration to the manifest manipulator for dynamic insertion of the advertisement into the client content stream upon occurrence of an advertisement break message in the client content stream.

In implementations, the predictive advertisement break duration machine learning model is trained on historical content, advertisement break messages, advertisement break message data, and program information. In implementations, the predictive advertisement break duration machine learning model is further configured to continuously train on each client content stream processed by the system. In implementations, the predictive advertisement break duration machine learning model is further configured to receive feedback upon the occurrence of the advertisement break message. In implementations, the predictive advertisement break duration machine learning model is further configured to compare an actual advertisement break duration in the advertisement break message with the predicted advertisement break duration upon the occurrence of the advertisement break message and receive a reward based on the comparison. In implementations, the system further includes a cache connected to the predictive advertisement break duration machine learning model and the advertisement router, the cache configured to store certain of the predicted advertisement break durations in a cache based on at least client and time of day. In implementations, the predicted advertisement break durations are indexed by program information.

Described is a method for providing predictive advertisement break durations during content streaming. In implementations, the method includes providing, by a predictive advertisement break duration machine learning model, predictive advertisement break durations for content streams, receiving, by an advertisement router, a pre-decision request from a manifest manipulator for a client content stream, obtaining, by the advertisement router, a predictive advertisement break duration for the pre-decision request, obtaining, by the advertisement router, an advertisement based on the pre-decision request and the predictive advertisement break duration, and sending, by the advertisement router to the manifest manipulator, the advertisement for dynamic insertion into the client content stream upon occurrence of an advertisement break message in the client content stream. In implementations, the method further includes sending, by the advertisement router to the manifest manipulator, the predictive advertisement break duration. In implementations, the method further includes training the advertisement break duration machine learning model on historical content, advertisement break messages, advertisement break message data, and program information. In implementations, the method further includes providing feedback to the advertisement break duration machine learning model upon occurrence of the advertisement break message. In implementations, the method further includes comparing, by the predictive advertisement break duration machine learning model, an actual advertisement break duration in the advertisement break message with the predicted advertisement break duration upon the occurrence of the advertisement break message and applying, by the predictive advertisement break duration machine learning model, a reward based on the comparison. In implementations, the method further includes storing certain of the predicted advertisement break durations in a cache based on at least client and time of day.

Although some teachings and/or embodiments herein refer to methods, it will be appreciated by one skilled in the art that they may also be embodied as a system or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects may take the form of a computer program product embodied in one or more the computer readable mediums having the computer readable program code embodied thereon. For example, the computer readable mediums can be non-transitory. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

As used herein, the term "computer-readable medium" encompasses one or more computer-readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

Computer program code for carrying out operations for aspects may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects are described herein with reference to flowchart illustrations and/or block diagrams of methods, apparatus (systems) and computer program products according to teachings and/or embodiments. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various teachings and/or embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain teachings and/or embodiments, it is to be understood that the disclosure is not to be limited to the disclosed teachings and/or embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for dynamically inserting advertisements, the method comprising:

determining, by a predictive advertisement break duration machine learning model in a service provider system, predicted advertisement break durations for content being streamed by clients;

generating, by a pre-decision engine in the service provider system, prior to occurrence of an advertisement break message, pre-decision requests to obtain advertisements for content currently being streamed by one or more clients;

obtaining, by an advertisement router in the service provider system, a predicted advertisement break duration associated with each of the pre-decision requests;

obtaining, by the advertisement router, advertisements in response to each pre-decision request and associated predicted advertisement break duration; and dynamically inserting, by a manifest manipulator in the service provider system, an advertisement, obtained in response to a pre-decision request, in content for which the advertisement break message has occurred.

2. The method of claim 1, further comprising:

training the advertisement break duration machine learning model on a training dataset including historical content, advertisement break messages, advertisement break message data, and program information; and deploying the advertisement break duration machine learning model in the service provider system.

3. The method of claim 1, further comprising:

continuously training the advertisement break duration machine learning model on each content processed by the service provider system.

4. The method of claim 1, further comprising:

providing feedback to the advertisement break duration machine learning model upon occurrence of the advertisement break message.

5. The method of claim 4, wherein the providing further comprising:

comparing an actual advertisement break duration in the advertisement break message with the predicted advertisement break duration; and applying a reward to the advertisement break duration machine learning model based on the comparing.

6. The method of claim 1, further comprising:

storing certain of the predicted advertisement break durations in a cache based on at least client and time of day.

7. The method of claim 1, wherein the predicted advertisement break durations are indexed by program information.

8. A system, comprising:

a predictive advertisement break duration machine learning model configured to provide predictive advertisement break durations for content streams; and an advertisement router configured to:

receive a pre-decision request from a manifest manipulator for a client content stream prior to occurrence of an advertisement break message in the client content stream;

obtain a predictive advertisement break duration for the pre-decision request;

obtain an advertisement based on the pre-decision request and the predictive advertisement break duration; and send the advertisement and the predictive advertisement break duration to the manifest manipulator for dynamic insertion of the advertisement into the client content stream upon occurrence of the advertisement break message in the client content stream.

9. The system of claim 8, wherein the predictive advertisement break duration machine learning model is trained on historical content, advertisement break messages, advertisement break message data, and program information.

10. The system of claim 8, wherein the predictive advertisement break duration machine learning model is further configured to continuously train on each client content stream processed by the system.

11. The system of claim 8, wherein the predictive advertisement break duration machine learning model is further configured to receive feedback upon the occurrence of the advertisement break message.

12. The system of claim 8, wherein the predictive advertisement break duration machine learning model is further configured to:

compare an actual advertisement break duration in the advertisement break message with the predicted advertisement break duration upon the occurrence of the advertisement break message; and receive a reward based on the comparing.

13. The system of claim 8, further comprising:

a cache connected to the predictive advertisement break duration machine learning model and the advertisement router, the cache configured to store certain of the predicted advertisement break durations in a cache based on at least client and time of day.

14. The system of claim 8, wherein the predicted advertisement break durations are indexed by program information.

15. A method, comprising:

providing, by a predictive advertisement break duration machine learning model, predictive advertisement break durations for content streams;

receiving, by an advertisement router, a pre-decision request from a manifest manipulator for a client content stream prior to occurrence of an advertisement break message in the client content stream;

obtaining, by the advertisement router, a predictive advertisement break duration for the pre-decision request;

obtaining, by the advertisement router, an advertisement based on the pre-decision request and the predictive advertisement break duration; and sending, by the advertisement router to the manifest manipulator, the advertisement for dynamic insertion into the client content stream upon occurrence of the advertisement break message in the client content stream.

16. The method of claim 15, further comprising:

sending, by the advertisement router to the manifest manipulator, the predictive advertisement break duration.

17. The method of claim 15, further comprising:

training the advertisement break duration machine learning model on historical content, advertisement break messages, advertisement break message data, and program information.

18. The method of claim 15, further comprising:

providing feedback to the advertisement break duration machine learning model upon occurrence of the advertisement break message.

19. The method of claim 15, further comprising:

comparing, by the predictive advertisement break duration machine learning model, an actual advertisement break duration in the advertisement break message with the predicted advertisement break duration upon the occurrence of the advertisement break message; and applying, by the predictive advertisement break duration machine learning model, a reward based on the comparing.

20. The method of claim 15, further comprising:

storing certain of the predicted advertisement break durations in a cache based on at least client and time of day.

* * * * *